United States Patent [19]

MacDowell et al.

[11] 4,042,362
[45] Aug. 16, 1977

[54] PRODUCTION OF GLASS-CERAMIC ARTICLES

[75] Inventors: John F. MacDowell, Painted Post; Hermann L. Rittler, Horseheads, both of N.Y.

[73] Assignee: Corning Glass Works, Corning, N.Y.

[21] Appl. No.: 687,591

[22] Filed: May 18, 1976

[51] Int. Cl.² .................... C03B 32/00; C03C 3/22
[52] U.S. Cl. ................................ 65/33; 106/39.6; 106/39.7; 106/39.8
[58] Field of Search .......... 65/33; 106/39.6, 39.7, 106/39.8

[56] References Cited

U.S. PATENT DOCUMENTS

| | | | |
|---|---|---|---|
| 3,798,014 | 3/1974 | Bondarev et al. | 65/33 |
| 3,839,053 | 10/1974 | Rittler | 65/33 X |
| 3,847,582 | 11/1974 | Kozmin et al. | 65/33 |
| 3,899,340 | 8/1975 | Malmendier | 65/33 X |
| 3,907,577 | 9/1975 | Kiefer et al. | 65/33 X |
| 3,926,602 | 12/1975 | Andrus et al. | 65/33 |
| 3,929,497 | 12/1975 | Monks | 65/33 |

Primary Examiner—S. Leon Bashore
Assistant Examiner—Frank W. Miga
Attorney, Agent, or Firm—Clinton S. Janes, Jr.; Clarence R. Patty, Jr.

[57] ABSTRACT

The instant invention is concerned with a unique method for crystallizing glass bodies into glass-ceramic articles. More particularly, this invention is drawn to a method whereby glass-ceramic articles can be formed without cooling the precursor glass below the transformation range thereof. Thus, the glass melt is cooled and formed into a vitreous body. This vitreous body is cooled to a temperature no lower than about 25°–250° C. above the transformation range where nucleation is developed therewithin. Essentially immediately thereafter, the nucleated body is exposed to a temperature between about 100°–500° C. higher than that of the nucleation step to cause the growth of crystals on the nuclei. The process significantly expedites the production of glass-ceramic articles and substantially reduces energy consumption from the forming stage to the finished product.

6 Claims, 3 Drawing Figures

PRODUCTION OF GLASS-CERAMIC ARTICLES

In the conventional practice for producing glass-ceramic articles, as is exemplified in U.S. Pat. No. 2,920,971, the basic patent in the field of glass-ceramics, a precursor glass body is crystallized in situ through a two-step heat treatment utilizing a sequence including nucleation followed by crystallization. Hence, in the customary commercial manufacture of glass-ceramic articles, a glass-forming batch is melted; the melt is cooled to at least within, and normally below, the transformation range to form a glass body; and the glass body then reheated to cause crystallization in situ. This heat treatment conventionally comprises two steps. First, the glass body is heated to a temperature within or somewhat above the transformation range to cause the development of nuclei in the glass. This process commonly requires about 1–6 hours. Subsequently, the nucleated body is heated to a higher temperature, frequently above the softening point of the glass, to effect the growth of crystals on the nuclei. This step normally involves about 1–8 hours.

This two-step nucleation-crystallization practice has been followed to insure the production of fine-grained crystalline bodies exhibiting very little dimensional change from the parent glass body. Nevertheless, from the practical commercial point of view, the relatively extended times employed in the nucleation and crystallization steps have not been looked upon with favor. Thus, there has been much effort exerted to devise means for obtaining fine-grained crystalline-glass ceramic articles of stable dimensions in much shorter times and whereby the consumption of energy required would be greatly reduced.

For example, U.S. Pat. No. 3,804,608 disclosed a method for making glass-ceramic articles where no reheating of a glass body was required. In that method a molten glass-forming batch was cooled to a temperature ranging from about 50° to 350° C. above the transformation range, held at that temperature for no more than about 30 minutes to cause crystallization in situ, and then cooled to room temperature.

U.S. Pat. No. 3,809,543 described a method for making glass-ceramic articles wherein a glass-forming batch is melted; the melt is cooled to below the transformation range to shape the material and support is provided for the shaped material; the supported shaped material is heated to a temperature between the transformation range and 220° C. thereabove to develop nuclei therein (denominated "embryonic centers of crystal growth" by the patentees); and then is rapidly heated to a temperature between about 800°–1250° C. to cause the growth of crystals on the nuclei. In general, the nucleation step required about 2–30 minutes and the total crystallization process ranged between about 10–40 minutes with a bath of molten tin providing the physical support for the material.

U.S. Pat. No. 3,846,101 disclosed a method for preparing glass-ceramic articles generally similar to that of U.S. Pat. No. 3,809,543, supra. A glass article is suspended in a vertical attitude; the suspended glass article is heated to a temperature between the transformation range and 100° C. thereabove to develop nuclei therein; and then is rapidly heated to a temperature between about 800°–1280° C. to effect the growth of crystals on the nuclei. Some viscous flow occurs during crystal growth which is deemed beneficial in relaxing crystallization stresses.

Finally, U.S. application Ser. No. 559,730, filed Mar. 19, 1975 now U.S. Pat. No. 4,000,998 in the name of H. L. Rittler, described a method for producing glass-ceramic articles where no reheating of a glass body was required. That method comprised melting a glass-forming batch; rapidly cooling the melt to a temperature about 100°–300° C. above the annealing point to form a glass body and cause phase separation with consequent nucleation to take place therein; exposing the nucleated glass to a temperature between the annealing point and the temperature of nucleation to effect crystallization on the nuclei; and then cooling the crystallized article to room temperature. Times as short as a few minutes for the full process are described.

Each of those four proposed methods can yield fine-grained glass-ceramic articles where the base glass compositions are carefully chosen, but the dimensional instability of the final product, i.e., the change of shape undergone by the precursor glass body, has been so great in articles of any substantial bulk as to discourage attempts to put any of the methods into large scale commercial production.

SUMMARY OF THE INVENTION

We have discovered a method for producing glass-ceramic articles exhibiting no more dimensional change from the parent glass body than that customarily observed in the conventional method of forming glass-ceramics, as described above, wherein the crystallization phenomenon can be accomplished in less than 10 minutes to yield a fine-grained crystalline microstructure. The method enables the production of metastable crystal phases in the glass-ceramic articles since the rapidity of the crystallization inhibits the conversion of such phases into equilibrium states; such as occurs in the longer crystallization heat treatments practiced in the conventional preparation of glass-ceramic articles. Thus, through selection of composition, a desired crystal phase can be grown within the article such that the physical properties thereof can be tailored substantially at will.

The method involves four general steps:

First, a batch for a thermally crystallizable glass is melted;

Second, the molten batch is cooled to a temperature about 25°–250° C. above the transformation range ($T_g$) to achieve nucleation therein;

Third, the nucleated body is exposed to a temperature about 100°–500° C. above that utilized in the nucleation step to cause the growth of crystals on the previously-developed nuclei;

Fourth, the crystallized article is cooled to room temperature.

In general, since nucleation is carried out at relatively high temperatures, the phenomenon occurs very quickly, commonly within 1–5 minutes or less. Inasmuch as crystal growth on the nuclei can occur in the nucleation temperature range, excessive exposure to such temperatures is undesirable as leading to size inhomogeneity of the crystals and, in certain instances, the development of crystals having an identity other than that desired in the final product. Therefore, a nucleation period of 0.5 hour at the cooler extreme of the nucleation zone has been adjudged to be a practical maximum with much shorter periods being greatly preferred.

In the most desirable practice, the nucleated body will be plunged directly into the crystallization range of temperatures. Thus, in the preferred embodiment of the invention, the crystallization step will immediately follow nucleation, this again to inhibit crystal inhomogeneity and the growth of unwanted crystal phases. Therefore, the temperature will be raised from the nucleation range into the temperature interval for crystallization at a rate of at least 10° C./minute. A highly crystalline body will commonly be produced after no more than about 1–5 minutes within the crystallization range. Extended periods within the crystallization interval do not appear to improve the microstructure of, or substantially increase the crystallinity of, the final product. Moreover, long exposures will convert metastable crystal phases into equilibrium states which may or may not impart the desired properties to the final product. As a result, a crystallization time of 0.5 hour has been deemed a practical maximum with much shorter periods being greatly preferred. In general, the temperature of crystallization will range between about 900°–1250° C.

The crystallized final product can be rapidly cooled to room temperature. Hence, in many instances, the articles can simply be removed from the heat treating chamber into the ambient atmosphere. Where thick-walled articles are involved and/or the coefficient of thermal expansion of the crystallized material is high, a slower rate of cooling will be required to prevent cracking or spalling. Nevertheless, such practice is well within the integrity of the glass-ceramic technologist.

BRIEF DESCRIPTION OF THE DRAWINGS

FIG. 1 graphically sets forth the four basic steps comprising the method of the instant invention. No attempt has been made to draw the process to scale and the drawing generally depicts first cooling the molten batch into the range of nucleation temperatures, holding therein for a brief period, thereafter plunging the nucleated body into the temperature interval of crystallization, maintaining therein for a brief period, and then removing the crystallized article into the ambient atmosphere. The zones of temperatures for nucleation and crystallization are generally depicted utilizing the transformation range as the base line. It will be apparent that the temperatures of these two phenomena are a function of the composition of the individual material.

DESCRIPTION OF PREFERRED EMBODIMENTS

Figure 1:
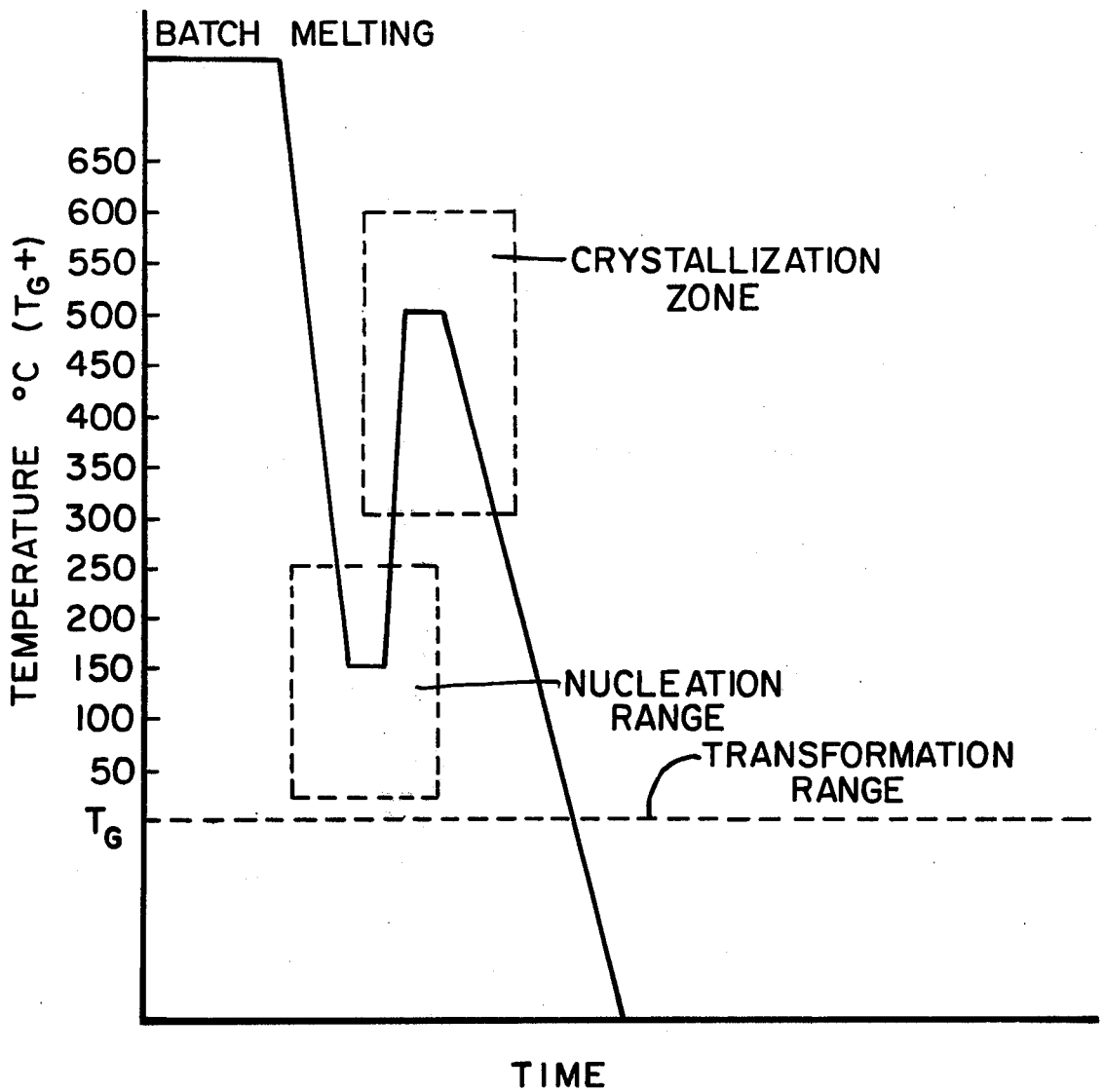
FIG. 1 is a graphicallic illustration the steps of the invention.

Table I reports approximate compositions of a number of glasses, expressed in parts by weight on the oxide basis, which can be operable in the instant invention. The actual batch ingredients can comprise any materials, either the oxide or other compound, which, when melted together, will be converted into the desired oxides in the proper proportions. Since it is not known with which cation(s) the fluorine is combined, it is reported simply as fluoride in accordance with conventional glass analysis practice.

The batches can be melted in platinum crucibles at about 1500°–1650° C., depending upon composition, and the melts then poured into preheated steel molds to yield discs having a thickness dimension of about 0.25 inch. Cane about 0.25 inch in diameter can be hand drawn for physical property measurements. The molds will be immediately transferred to an electrically-fired furnace operating at a temperature within the nucleation zone, maintained at that temperature for a predetermined period, the temperature of the furnace raised at maximum furnace rate (estimated to be about 10° C./minute) to a temperature within the crystallization interval, and maintained at that temperature for a predetermined length of time. (If a second furnace is available, it can be operated at the crystallization temperature and the nucleated body plunged thereinto). Thereafter, the electric current to the crystallization furnace can be cut off, the door to the furnace placed ajar, and the discs cooled to room temperature within the furnace or removed directly into the ambient environment if the coefficient of thermal expansion of the discs is low enough to avoid cracking. The resulting rate of cooling is estimated to average about 60°–500° C./minute.

Although specific dwell periods at predetermined temperatures are frequently employed as a matter of convenience, such are not demanded for the successful operation of the invention. Hence, it is only necessary that the glass body be exposed to temperatures within the nucleation and crystallization zones. For instance, as is illustrated in Examples 1–3 of Table II, no explicit dwell period was used but the temperature of the body was continually raised through the nucleation zone such that the total exposure time within that temperature interval was less than five minutes. An approximation of that time is reported in the Table.

Table I also records the strain point (S.P.) and annealing point (A.P.) for each composition. The transformation range ($T_g$) has been defined as that temperature at which a molten batch has become an amorphous mass and has generally been considered to lie between about the strain point and annealing point of a glass.

TABLE I

|  | 1 | 2 | 3 | 4 | 5 | 6 | 7 |
|---|---|---|---|---|---|---|---|
| $SiO_2$ | 69.5 | 66.7 | 63.4 | 66.6 | 47.0 | 46.7 | 43.0 |
| $Al_2O_3$ | 17.6 | 20.5 | 20.0 | 20.4 | 16.7 | 28.2 | 26.0 |
| $Li_2O$ | 2.7 | 3.5 | 3.5 | 3.3 | — | — | 0.5 |
| MgO | 2.6 | 1.6 | 1.9 | 1.7 | 14.5 | 13.2 | 1.0 |
| ZnO | 1.0 | 1.2 | 2.4 | 1.3 | — | — | — |
| $TiO_2$ | 4.7 | 4.8 | 4.7 | 4.9 | — | 11.5 | 10.0 |
| $ZrO_2$ | 0.2 | 0.05 | — | 0.1 | — | — | — |
| $As_2O_3$ | 0.9 | 0.4 | 1.3 | 1.1 | — | 0.4 | 0.5 |
| F | 0.03 | 0.22 | — | 0.5 | 6.3 | — | — |
| $Fe_2O_3$ | 0.06 | 0.035 | — | 0.03 | — | — | — |
| $B_2O_3$ | 0.07 | — | 2.3 | 0.01 | 8.5 | — | — |
| $MnO_2$ | 0.03 | — | — | — | — | — | — |
| $Na_2O$ | — | — | — | 0.4 | — | — | 12.0 |
| $K_2O$ | — | — | — | 0.2 | 9.5 | — | — |
| CaO | — | — | 0.1 | — | — | — | 7.0 |
| S.P. | 636 | 630 | 594 | 630 | 590 | | |
| A.P. | 681 | 676 | 640 | 676 | 646 | | |

Table II recites various nucleation and crystallization treatments applied to the glass compositions of Table I. The nucleation temperature represents the temperature to which the mold was preheated. A visual description of each article is recorded along with a report of the crystal phases present as identified through X-ray diffraction analysis, and such physical property measurements as coefficient of thermal expansion over the range of 25°–600° C. ($\times 10^{-7}$/° C.) and modulus of rupture (psi) were made. The modulus of rupture measurements were conducted on bars or canes that had previously been surface abraded. Inasmuch as the beta-quartz and beta-spodumene crystals are solid solutions, they are reported in the Table as beta-quartz s.s. and beta-spodumene s.s., respectively.

Example 1 is believed to lie between the strain point, 636° C., and the annealing point, 681° C., thereof). Also, a rapid crystallization temperature of 900° C. appears to

TABLE II

| Example No. | Nucleation Treatment | Crystallization Treatment | Visual Description | Crystal Phases | Exp. Coef. | Modulus of Rupture |
|---|---|---|---|---|---|---|
| 1 | 650° C.–10 minutes | 1150° C.–3 minutes | Very find grained, white, opaque | Beta-spodumene s.s., beta-quartz s.s., trace rutile | 10 | — |
| 1 | 700° C.–10 minues | Ibid | Ibid | Beta-quartz s.s., beta-spodumene s.s. | 9 | — |
| 1 | 800° C.–10 minutes | Ibid | Ibid | Ibid | 8 | — |
| 1 | 900° C.–10 minutes | Ibid | Glassy, transparent, slight surface crystallization | Essentially glass | — | — |
| 1 | 3 minutes | 900° C.–2 minutes | Amber, transparent, glassy | Ibid | — | 9500 |
| 1 | Ibid | 900° C.–6 minutes | Ibid | Ibid | — | 10,000 |
| 1 | 2 minutes | 1000° C.–2 minutes | Amber, translucent, glassy, slightly hazy | Mostly glass, trace beta-quartz, s.s. | — | 9600 |
| 1 | Ibid | 1000° C.–4 minutes | Very fine-grained, gray, opaque | Beta-quartz s.s. with little beta-spodumene s.s. | 7.4 | 10,800 |
| 1 | 1 minute | 1100° C.–2 minutes | Ibid | Ibid | 7.1 | 10,300 |
| 1 | Ibid | 1200° C.–2 minutes | Ibid | Beta-spodumene s.s., beta-quartz s.s., trace rutile | 6.8 | 13,000 |
| 1 | Ibid | 1200° C.–4 minutes | Very fine-grained white, opaque | Beta-spodumene s.s., trace rutile | 9.2 | 16,100 |
| 1 | 750° C.–10 minutes | 1080° C.–8 minutes | Ibid | Beta-quartz s.s., beta-spodumene s.s., trace rutile | 9.6 | — |
| 1 | 800° C.–10 minutes | 1080° C.–8 minutes | Ibid | Beta-quartz s.s., trace rutile | 9.8 | — |
| 1 | 800° C.–10 minutes | 1050° C.–4 minutes | Very fine-grained, translucent, gray | Ibid | 11.7 | — |
| 1 | 800° C.–10 minutes | 1100° C.–4 minutes | Very fine-grained, white, opaque | Ibid | 11.3 | — |
| 1 | 750° C.–10 minutes | 1150° C.–4 minutes | Ibid | Beta-quartz s.s., beta-spodumene s.s. | 8.2 | — |
| 2 | 3 minutes | 900° C.–6 minutes | Very fine-grained, transparent, slight haze | Beta-quartz s.s. | 19 | 8,700 |
| 2 | 2 minutes | 1000° C.–3 minutes | Very fine-grained, gray, opaque | Beta-spodumene s.s. | 8.9 | 11,100 |
| 2 | 1 minute | 1100° C.–3 minutes | Very fine-grained, white, opaque | Beta-spodumene s.s. | 7.1 | 11,500 |
| 2 | 1 minute | 1200° C.–3 minutes | Ibid | Ibid | 6.8 | 13,200 |
| 3 | 2 minutes | 1000° C.–2 minutes | Very fine-grained, white, opaque | Beta-spodumene s.s., beta-quartz | 9.3 | 11,900 |
| 3 | Ibid | 1000° C.–4 minutes | Ibid | Ibid | — | 13,400 |
| 3 | Ibid | 1000° C.–6 minutes | Ibid | Ibid | — | 13,500 |
| 3 | 1 minute | 1100° C.–2 minutes | Ibid | Beta-spodumene s.s., rutile | 14.8 | 13,600 |
| 3 | Ibid | 1100° C.–4 minutes | Ibid | Ibid | — | 14,000 |
| 3 | Ibid | 1100° C.–6 minutes | Ibid | Ibid | — | 15,400 |
| 3 | Ibid | 1200° C.–2 minutes | Fine-grained, white, opaque, warped | Ibid | 18.8 | 14,300 |
| 3 | 600° C.–10 minutes | 1000° C.–3 minutes | Very fine-grained, gray, opaque | Ibid | — | — |
| 3 | 700° C.–10 minutes | 1050° C.–3 minutes | Very fine-grained, white, opaque | Ibid | — | — |
| 4 | Ibid | 1000° C.–3 minutes | Very fine-grained, white, opaque | Beta-spodumene s.s., rutile | 13.1 | — |
| 4 | Ibid | 1100° C.–3 minutes | Ibid | Ibid | — | — |
| 4 | Ibid | 1200° C.–3 minutes | Ibid | Ibid | — | — |
| 5 | Ibid | 1050° C.–3 minutes | Ibid | Fluormica | 89.0 | — |
| 6 | Ibid | 1050° C.–3 minutes | Very fine-grained white, opaque | Cordierite | 31.1 | — |
| 7 | 800° C.–10 minutes | 1000° C.–3 minutes | | Nepheline, rutile | 10.7 | — |

An analysis of Tables I and II can point up several features of the instant invention. For example, a nucleation temperature of 900° C. is too high for Example 1. Thus, at that temperature the glass body was so fluid that nuclei were not precipitated out such that no sites were provided for subsequent crystal growth in the higher temperature range. (The transformation range of Example 1 is believed to lie between the strain point, 636° C., and the annealing point, 681° C., thereof). Also, a rapid crystallization temperature of 900° C. appears to be too low for Example 1. Thus, the final article was substantially free from crystallization. Furthermore, a crystallization temperature of 1200° C. seems to be too high for Example 3 since dimensional instability of the body (warping) occurred.

Where the molten batch is cooled to below the transformation range and then rapidly reheated into the nucleation and crystallization ranges, considerable deformation of the body results. It is postulated that where the glass is cooled only the nucleation range, nucleation takes place extremely rapidly and the mass is of sufficiently low viscosity that internal stresses are relieved. However, where the glass is cooled below the nucleation range and then reheated, nucleation is not so rapid and the mass is of a much higher viscosity. Therefore, the crux of the instant invention resides in cooling the molten glass-forming batch to within the nucleation zone prior to reheating into the temperature interval for crystallization.

As was observed above, the present invention enables glass-ceramic articles to be produced wherein a metastable crystal phase comprises the predominant crystal phase. An interesting illustration of that capability can be seen in Example 1. That example approximates that composition of Code 9608, marketed by Corning Glass Works, Corning, N.Y., under the trademark CORNING WARE. The predominant crystal phases present in Code 9608 is beta-spodumene solid solution. Yet, in the rapid crystallization practice of the instant invention, beta-quartz solid solution has been developed as the predominant crystal phase. Hence, in the conventional crystallization procedure employed in the manufacture of CORNING WARE items, the heat treatment is continued for so long a period that the beta-quartz is converted to the equilibrium phase, beta-spodumene.

This change in crystal species will obviously affect the physical properties demonstrated by the final product. For example, whereas Code 9608 normally exhibits a coefficient of thermal expansion over the temperature interval 25°–300° C. of about $13 \times 10^{-7}/°$ C., Table II illustrates values between about $6-8 \times 10^{-7}/°$ C. Also, the infra-red transmission of Code 9608 at a wavelength of 3.5 microns through polished plates of 4.25 mm thickness is essentially 0. In contrast, the articles of this invention will exhibit a transmission to infra-red radiation of about 60–70% under the same conditions. Finally, the chemical durability is significantly altered.

Reported below are the results obtained in conventional tests for acid and alkaline durability. In each test a sample of the glass-ceramic is carefully weighed and its surface area measured precisely so that weight loss in milligrams per square centimeter (mg/cm²) can be calculated. In the acid test, a sample is immersed for 24 hours in a 5% by weight aqueous solution of HCl heated to 95° C. In the alkaline test, a sample is immersed for six hours in a 5% by weight aqueous solution of NaOH heated to 95° C.

In the following table, the notation Code 9608 was a sample of the commercially-marketed product discussed above. The three samples of Example 1 were nucleated at 750° C. for 10 minutes and then crystallized in the manner set forth in the table.

|  | 5% HCl | 5% NaOH |
| --- | --- | --- |
| Code 9608 | 0.12 | 2.82 |
| Example 1 (3 minutes at 1000° C.) | 0.01 | 0.65 |
| Example 1 (3 minutes at 1100° C.) | 0.01 | 0.85 |
| Example 1 (3 minutes at 1200° C.) | 0.02 | 1.9 |

As can be readily observed, the chemical durability of the products crystallized in accordance with the instant invention is substantially improved.

It can be appreciated that the crystallization treatments can be conducted in atmospheres other than air. Hence, for example, the use of a $SO_2$ and/or $SO_3$-containing atmosphere, either during the crystallization step or subsequent thereto, will dealkalize the surface; in essence developing a laminated body in situ. The use of a wet atmosphere of $SO_2$ and/or $SO_3$ can lead to an exchange of $H^+$ for alkali metal ions. Customarily, the removal of alkali metal ions from the surface of the glass-ceramic will improve the chemical durability thereof. In some instances the removal of alkali metal ions will result in a surface layer having a lower coefficient of thermal expansion than the body portion. Such a phenomenon can result in an in situ surface compression layer leading to an integral self-strengthening effect.

Figure 2:
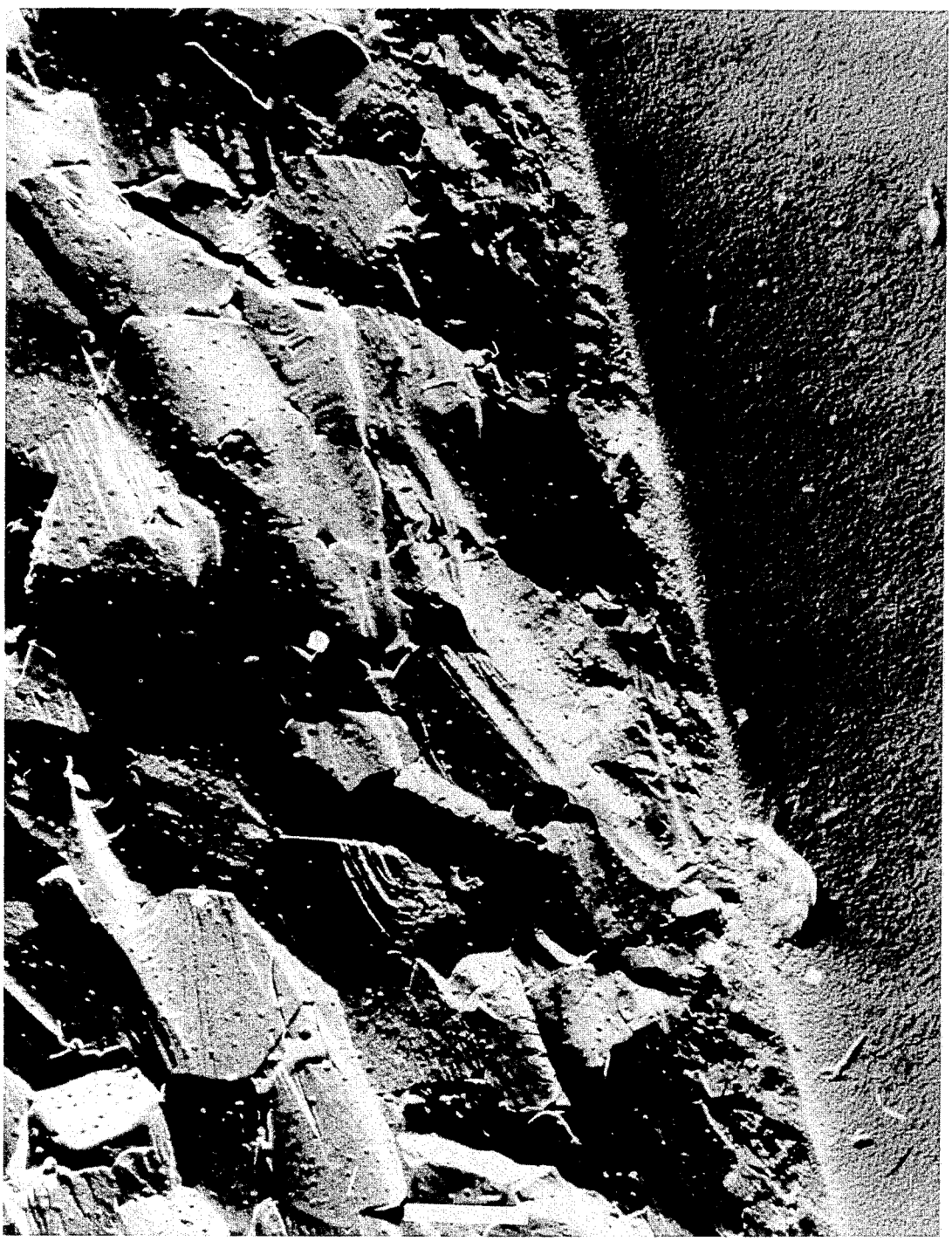
FIG. 2 is an election micrograph of a glass ceramic product of the invention.
Figure 3:
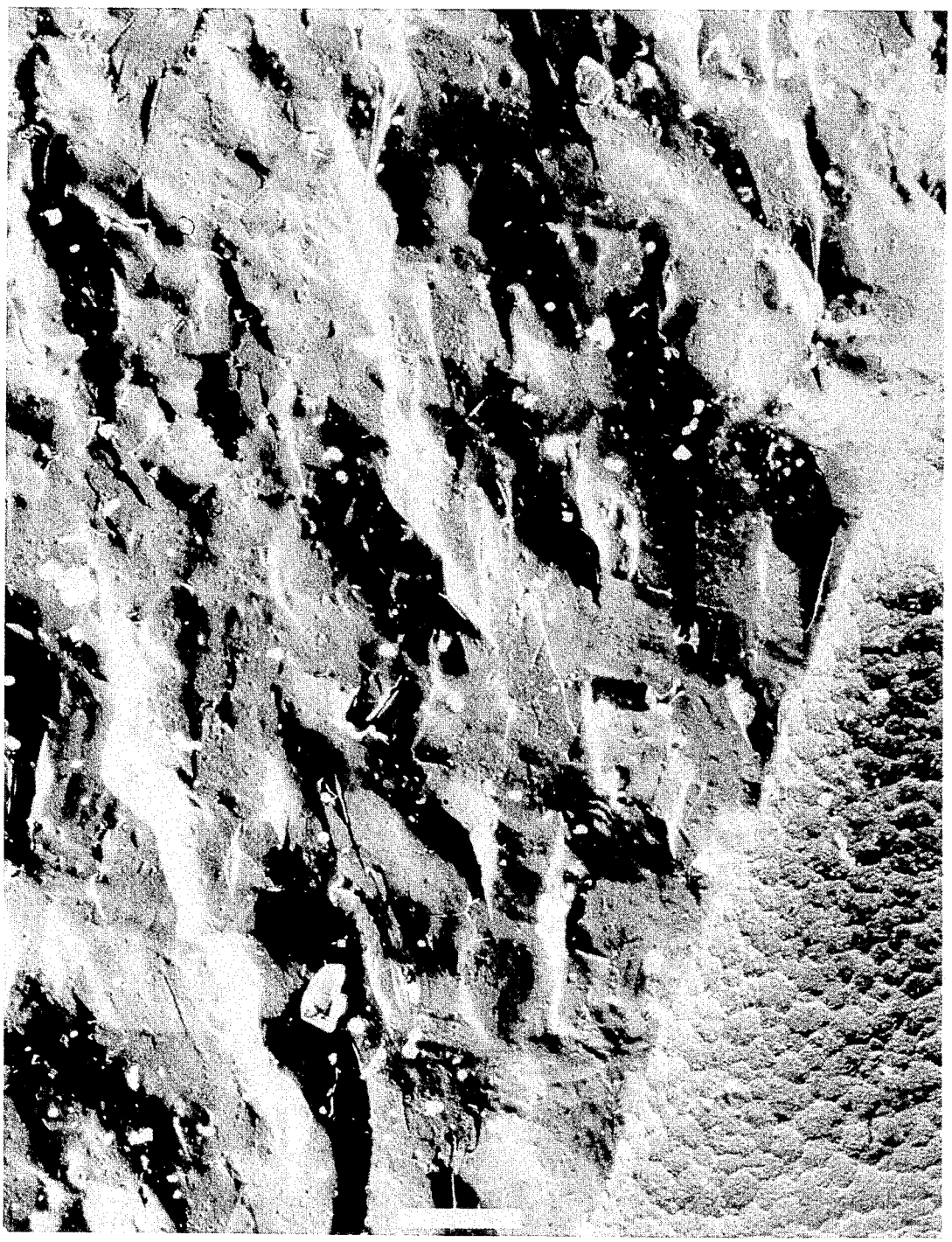
FIG. 3 is an election micrograph of a glass ceramic of the prior art.

FIG. 2 is a replica electron micrograph over the edge of a fracture surface of Example 1 nucleated for 10 minutes at 800° C. and crystallized for 8 minutes at 1080° C. illustrating the very fine-grained microstructure and very high crystallinity of the product. The edge of the glass-ceramic body can be seen as the limit of crystallization running as a diagonal line at the right of the micrograph. FIG. 3 is a replica electron micrograph over the edge of a fracture surface of Corning Code 9608 as commercially marketed. The edge of the glass-ceramic body can be seen as the limit of crystallization running as a diagonal line at the right of the micrograph. Although the latter demonstrates a very high crystallinity also, the difference in morphology between the beta-spodumene solid solution crystals of the Code 9608 and the beta-quartz solid solution crystals of Example 1 is quite evident when the two micrographs are compared. The white bar at the base of each micrograph designates a distance of one micron.

Whereas in the working examples reported above conventional furnaces were employed in the nucleation and crystallization steps, microwave energy can also be used to advantage. The use of such energy can yield a true self-laminated product since the temperature of the interior thereof can be made to lead or lag behind that of the surface depending upon whether microwave energy is applied to the entire body, or whether the body is simply heated from the surface inward utilizing conventional heat radiation. Hence, a combination of the two heating means can result in the interior portion of the body having a different crystal phase from that presently predominantly in the surface.

The mechanical strength of the crystallized bodies can be substantially improved through the application of a thermal tempering process such as is employed with glass articles. To demonstrate that practice, cane samples of about ¼ inch diameter were drawn from the composition of Example 7. The samples were nucleated at about 800° C. for about 10 minutes, exposed to 1000° C. for about three minutes, and thereafter subjected to a blast of cold air to quickly cool to room temperature. As a result of this air chill, an average modulus of rupture of between 20,000–25,000 psi was measured, as compared to about 10,000–15,000 psi when a conventional cooling procedure was utilized.

The strengthening mechanism at work here is not understood, but is believed to involve the minor amount of residual glass that is assumed to be present in the crystalline article. Air tempering is preferred because of its low cost and ease of use, but quenching in various liquids such as oils and salt baths can also be effective.

We claim:

1. A method for making a fine-grained glass-ceramic article comprising the steps of:
   a. melting a batch for a thermally crystallizable glass;
   b. cooling the melt to a temperature between about 25°–250° C. above the transformation range to form a glass body and holding said glass body within that range of temperatures for about 1–30 minutes to develop nuclei therein;
   c. heating the nucleated glass body at a rate of at least 10° C./minute to a temperature about 100°–500° C. above the nucleation temperature and holding said nucleated glass body within that range of temperatures for about 1–30 minutes to cause the growth of crystals on the nuclei;
   d. cooling the crystallized body to room temperature.

2. A method according to claim 1 wherein said nucleation is carried out for about 1–5 minutes.

3. A method according to claim 1 wherein said crystallization is carried out for about 1–5 minutes.

4. A method according to claim 1 wherein said crystallization is carried out at temperatures between about 900°–1250° C.

5. A method according to claim 1 wherein said crystallization is carried out in an atmosphere containing $SO_2$ and/or $SO_3$.

6. A method according to claim 1 wherein said crystallized body is quickly chilled to room temperature to thermally temper said body.

* * * * *